(12) United States Patent
Guedon

(10) Patent No.: US 12,142,938 B2
(45) Date of Patent: Nov. 12, 2024

(54) HW AND METHODS FOR IMPROVING SAFETY PROTOCOL IN WIRELESS CHARGERS

(71) Applicant: STMicroelectronics Asia Pacific Pte Ltd., Singapore (SG)

(72) Inventor: Yannick Guedon, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 18/412,718

(22) Filed: Jan. 15, 2024

(65) Prior Publication Data

US 2024/0154460 A1 May 9, 2024

Related U.S. Application Data

(62) Division of application No. 18/158,462, filed on Jan. 23, 2023, now Pat. No. 11,909,223, which is a division of application No. 17/374,840, filed on Jul. 13, 2021, now Pat. No. 11,588,344, which is a division of application No. 16/413,283, filed on May 15, 2019, now Pat. No. 11,095,146.

(51) Int. Cl.
*H02J 50/10* (2016.01)
*H02J 7/00* (2006.01)
*H02J 50/12* (2016.01)
*H02J 50/80* (2016.01)

(52) U.S. Cl.
CPC ............ *H02J 50/10* (2016.02); *H02J 7/0029* (2013.01); *H02J 50/12* (2016.02); *H02J 50/80* (2016.02)

(58) Field of Classification Search
CPC .......... H02J 50/10; H02J 7/0029; H02J 50/12; H02J 50/80
See application file for complete search history.

(56) References Cited

U.S. PATENT DOCUMENTS

| | | |
|---|---|---|
| 6,134,130 A | 10/2000 | Connell et al. |
| 8,169,185 B2 | 5/2012 | Partovi et al. |
| 9,065,276 B2 | 6/2015 | Kim et al. |
| 9,106,071 B2 | 8/2015 | Kohout |
| 9,508,487 B2 | 11/2016 | Von Novak et al. |
| 9,847,668 B2 | 12/2017 | Kim et al. |

(Continued)

FOREIGN PATENT DOCUMENTS

| | | |
|---|---|---|
| KR | 20140135357 A | 11/2014 |
| KR | 20180085175 A | 7/2018 |

OTHER PUBLICATIONS

Wireless Power Consortium, "Qi Certified: Assuring a Safe, Reliable Wireless Charging Experience", May 2018, 4 pages.

*Primary Examiner* — Daniel Cavallari
(74) *Attorney, Agent, or Firm* — Slater Matsil, LLP

(57) ABSTRACT

An over-voltage protection circuit and methods of operation are provided. In one embodiment, a method includes monitoring a voltage at an output of a rectifier, a voltage at an output of a voltage regulator, or a combination thereof. The method further includes determining the over-voltage condition based on the monitoring; and in response to determining the over-voltage condition, regulating the voltage at the output of the rectifier in accordance with a voltage difference between the voltage at the output of the rectifier and the voltage at the output of the voltage regulator.

20 Claims, 8 Drawing Sheets

(56) References Cited

U.S. PATENT DOCUMENTS

| | | |
|---|---|---|
| 2012/0293009 A1* | 11/2012 | Kim ..................... B60L 53/126 |
| | | 307/104 |
| 2015/0137611 A1 | 5/2015 | Huang et al. |
| 2015/0239354 A1 | 8/2015 | Gorai et al. |
| 2016/0020643 A1* | 1/2016 | Abe ....................... H02J 50/12 |
| | | 320/108 |
| 2016/0111892 A1 | 4/2016 | Joehren |
| 2016/0254689 A1 | 9/2016 | Lee et al. |
| 2017/0104368 A1 | 4/2017 | Radke et al. |
| 2020/0313424 A1 | 10/2020 | Woo et al. |

* cited by examiner

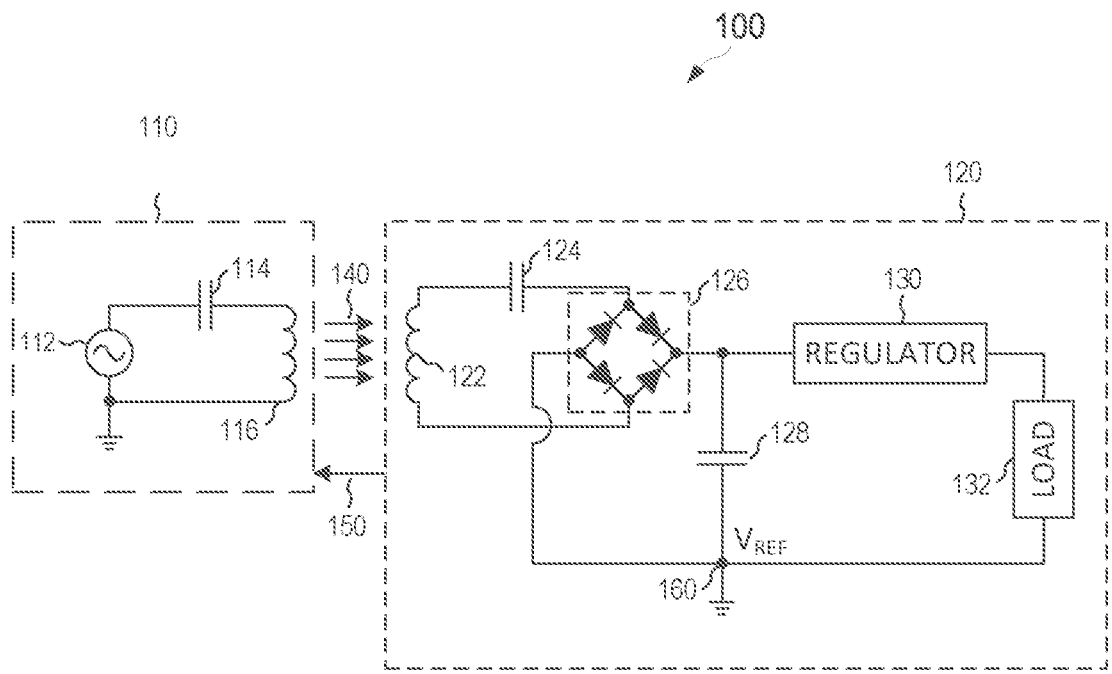
FIG. 1
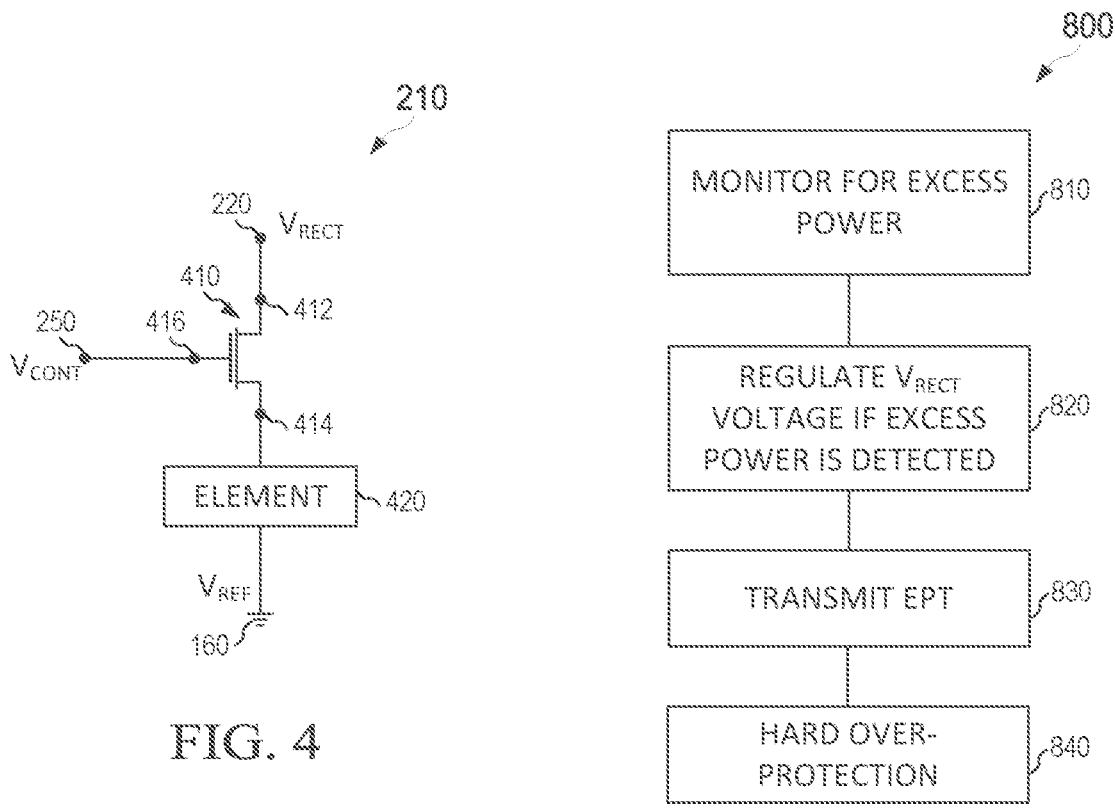
FIG. 4
FIG. 8

HW AND METHODS FOR IMPROVING SAFETY PROTOCOL IN WIRELESS CHARGERS

CROSS-REFERENCE TO RELATED APPLICATIONS

This application is a divisional application of U.S. application Ser. No. 18/158,462, filed Jan. 23, 2023, which is a divisional of U.S. application Ser. No. 17/374,840, filed on Jul. 13, 2021, now issued as U.S. Pat. No. 11,588,344, issued on Feb. 21, 2023, which is a divisional application of U.S. application Ser. No. 16/413,283, filed on May 15, 2019, now issued as U.S. Pat. No. 11,095,146 on Aug. 17, 2021, which applications are hereby incorporated by reference herein in their entirety.

TECHNICAL FIELD

The present disclosure relates generally to hardware (HW), and in particular embodiments, to an over-voltage protection circuit in a wireless power system.

BACKGROUND

Generally, a wireless power system uses mutual coupling to transfer power from a transmitting device to a receiving device. A myriad of causes can trigger the transmitting device to provide a voltage exceeding the operating capabilities of the various components of the receiving device. The excess power can cause hazardous conditions to the user, the receiving device, and the transmitting device.

Existing methods and systems use clamping of the AC voltage at the receiver side or de-tuning of the system impedance to counteract the excess voltage condition. For example, a Zener clamping circuit clamps the incoming AC voltage at the receiver side. As another example, de-tuning the receiving circuit may reduce the coupling factor between the primary winding and the secondary winding of the transformer and reduce the incoming power. Each solution can provide limited protection. However, the system remains susceptible to large amounts of incoming power.

Another method to counteract the excess power condition is hard over-voltage protection (HOVP). In hard over-voltage protection, when incoming voltage exceeds a threshold, the protection is triggered and the loading elements are shorted to ground. This solution disadvantageously causes the excess power to be dissipated solely in localized elements. Generally speaking, an excess of incoming power should be spread over several elements to avoid overstressing a single element. Additionally, the solution may cause in-band communication issues between the receiving device and the transmitting device, which may impact the response time for the transmitting device to reduce the excess power.

Thus, an improved system and method to overcome these and other limitations in the existing solutions to counteract over-voltage conditions in wireless power systems is desirable.

SUMMARY

Technical advantages are generally achieved by embodiments of this disclosure, which describe an over-voltage protection circuit in a wireless power system.

A first aspect relates to an over-voltage protection circuit, the over-voltage protection circuit includes a first and second differential amplifier, a comparator, a switch, and a regulating circuit. A first input of the first differential amplifier is coupled to an output of a rectifier and a second input of the first differential amplifier is coupled to an output of a voltage regulator. A first input of the second differential amplifier is coupled to an output of the first differential amplifier and a second input of the second differential amplifier is coupled to a first reference voltage. A first input of the comparator is coupled to the output of the first differential amplifier and a second input of the comparator is coupled to a second reference voltage. An input of the switch is coupled to the output of the second differential amplifier and a control terminal of the switch is coupled to an output of the comparator. An input of the regulating circuit is coupled to the output of the rectifier, a control terminal of the regulating circuit is coupled to the output of the switch, and an output of the regulating circuit is coupled to reference ground.

In a first implementation form of the over-voltage protection circuit according to the first aspect, the first differential amplifier is configured to provide an output voltage corresponding to an amplified difference between a voltage at the output of the rectifier and a voltage at the output of the voltage regulator. The output voltage of the first differential amplifier is provided to each of the comparator and the second differential amplifier.

In a second implementation form of the over-voltage protection circuit according to the first aspect as such or any preceding implementation form of the first aspect, the second differential amplifier is configured to provide a control voltage to the control terminal of the regulating circuit. A value of the control voltage corresponds to an amplified voltage difference between a voltage at the output of the rectifier and a voltage at the output of the voltage regulator in reference to the first reference voltage.

In a third implementation form of the over-voltage protection circuit according to the first aspect as such or any preceding implementation form of the first aspect, the comparator is configured to provide a control signal to the switch. A value of the control signal corresponds to an amplified voltage difference between a voltage at the output of the rectifier and a voltage at the output of the voltage regulator in reference to the second reference voltage.

In a fourth implementation form of the over-voltage protection circuit according to the first aspect as such or any preceding implementation form of the first aspect, the switch is activated in response to a voltage difference between a voltage at the output of the rectifier and a voltage at the output of the voltage regulator exceeding a first threshold, the voltage at the output of the rectifier exceeding a second threshold, the voltage the output of the voltage regulator exceeding a third threshold, or a combination thereof.

In a fifth implementation form of the over-voltage protection circuit according to the first aspect as such or any preceding implementation form of the first aspect, the regulating circuit is configured to regulate a voltage at the output of the rectifier in accordance with a control voltage provided by the second differential amplifier.

In a sixth implementation form of the over-voltage protection circuit according to the first aspect as such or any preceding implementation form of the first aspect, the regulating circuit includes an active device and a dissipating element.

A second aspect relates to device that includes a rectifier, a voltage regulator, a monitoring circuit, and a regulating circuit. The rectifier is configured to receive an alternating current (AC) voltage and output a direct current (DC) voltage. The voltage regulator is configured to receive the DC voltage and output a regulated DC voltage. The monitoring circuit includes a first differential amplifier, a second differential amplifier, a comparator, and a switch. The monitoring circuit is configured to monitor the DC voltage, the regulated DC voltage, a difference between the DC voltage and the regulated DC voltage, or a combination thereof. The regulating circuit configured to regulate the DC voltage in response to the monitoring circuit determining that the AC voltage exceeds a steady-state operating condition.

In a first implementation form of the device according to the second aspect, the monitoring circuit further includes a multiplexer, a second comparator, and a third comparator. The regulating circuit is activated based on a combinational logic of the value of the DC voltage, the regulated DC voltage, and a voltage difference between the DC voltage and the regulated DC voltage.

In a second implementation form of the device according to the second aspect as such or any preceding implementation form of the second aspect, the device further includes a microcontroller configured to communicate an End Power Transfer (EPT) request to stop the AC voltage in response to the AC voltage exceeding the steady-state operating condition.

In a third implementation form of the device according to the second aspect as such or any preceding implementation form of the second aspect, the microcontroller is configured to communicate the EPT request after a delay period is elapsed from a time that the regulating circuit begins to regulate the DC voltage.

In a fourth implementation form of the device according to the second aspect as such or any preceding implementation form of the second aspect, the communicating the EPT request is communicated using an in-band communication path.

In a fifth implementation form of the device according to the second aspect as such or any preceding implementation form of the second aspect, the regulating circuit is further configured to stop regulating the DC voltage after an elapsing of a programmable time period at which time the rectifier is configured in a hard over-voltage protection mode to stop receiving the AC voltage.

In a sixth implementation form of the device according to the second aspect as such or any preceding implementation form of the second aspect, the device further includes a load configured to receive the regulated DC voltage.

A third aspect relates to a method for regulating an over-voltage condition in a wireless power system, the method includes monitoring a voltage at an output of a rectifier, a voltage at an output of a voltage regulator, or a combination thereof. The method further includes determining the over-voltage condition based on the monitoring; and in response to determining the over-voltage condition, regulating the voltage at the output of the rectifier in accordance with a voltage difference between the voltage at the output of the rectifier and the voltage at the output of the voltage regulator.

In a first implementation form of the method according to the third aspect, the method further includes communicating an End Power Transfer (EPT) request using an in-band communication path after determining the over-voltage condition.

In a second implementation form of the method according to the third aspect as such or any preceding implementation form of the third aspect, the communicating the EPT request is delayed for a set length of time after determining the over-voltage condition.

In a third implementation form of the method according to the third aspect as such or any preceding implementation form of the third aspect, monitoring the voltages includes continuously comparing one or more of the voltage at the output of the rectifier, the voltage at the output of the voltage regulator, or a voltage difference between the voltage at the output of the rectifier and the voltage at the output of the voltage regulator to a respective reference voltage.

In a fourth implementation form of the method according to the third aspect as such or any preceding implementation form of the third aspect, each respective reference voltage is a programmable value.

In a fifth implementation form of the method according to the third aspect as such or any preceding implementation form of the third aspect, determining the over-voltage condition based on the monitoring includes determining that one or more combinational logic of the output of the comparing satisfies the over-voltage condition.

Embodiments can be implemented in hardware, software, or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 is a schematic diagram of a wireless power system;

FIG. 4 is a schematic of an embodiment regulating circuit for a wireless power system;

FIG. 8 is a flowchart of an embodiment method for monitoring and regulating voltages in a wireless power system to address an over-voltage condition.

DETAILED DESCRIPTION OF ILLUSTRATIVE EMBODIMENTS

Figure 2:
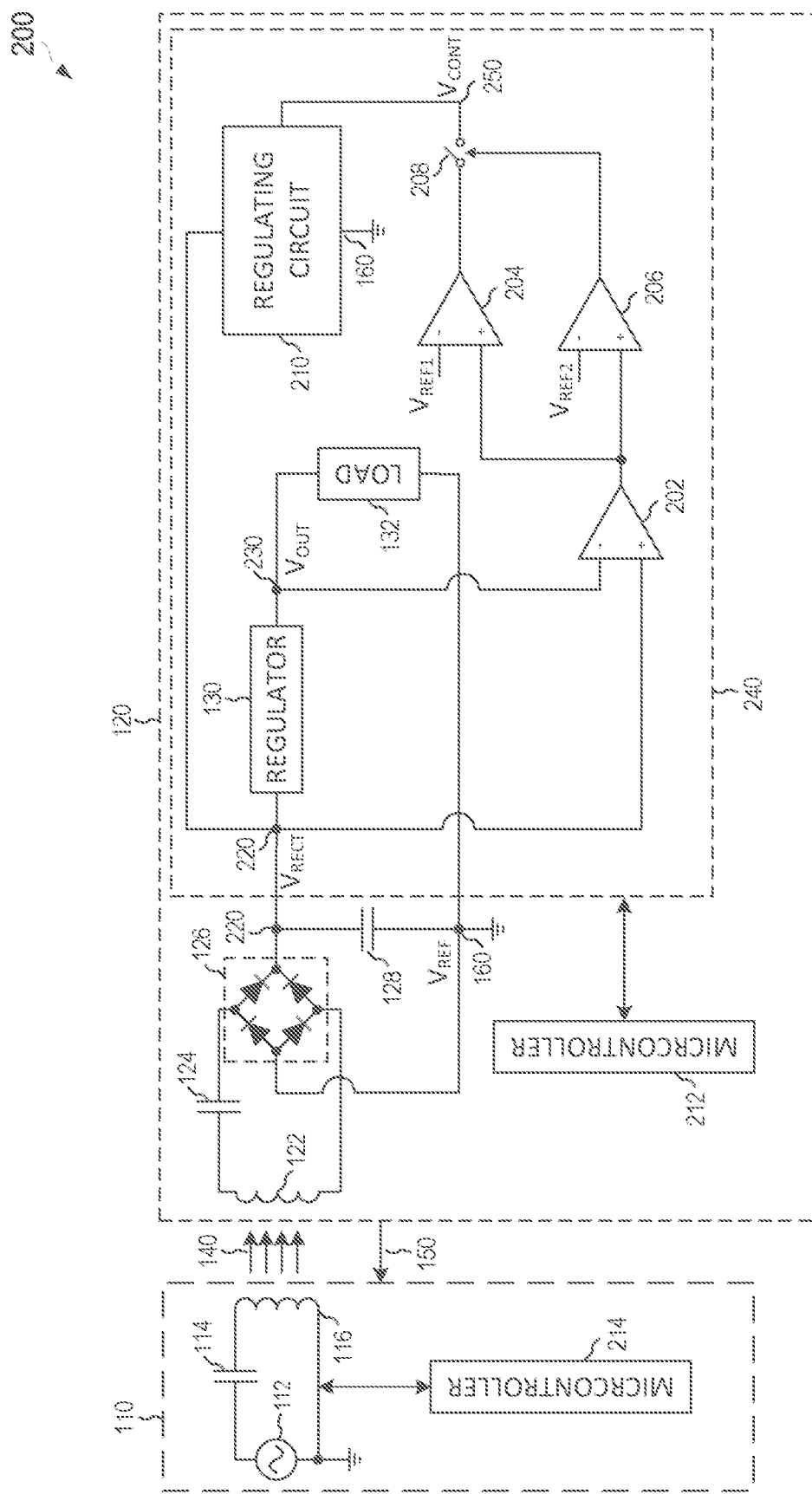
FIG. 2 is a schematic diagram of an embodiment wireless power system having a regulation loop circuit.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise.

Variations or modifications described with respect to one of the embodiments may also be applicable to other embodiments. Further, it should be understood that various changes, substitutions, and alterations can be made herein without departing from the spirit and scope of this disclosure as defined by the appended claims.

While the inventive aspects are described primarily in the context of a wireless power system and inductive coupling, it should also be appreciated that these inventive aspects may also be applicable to any type of wireless energy transfer. For example, the embodiment methods and systems described in this disclosure can be similarly applied to capacitive coupling. Furthermore, the wireless power system may operate using resonant or non-resonant coupling.

In a typical wireless power system, mutual coupling is used to wirelessly transfer power from a transmitting device to one or more receiving devices. For instance, a transmitting device generates an alternating current (AC), using a power source. An alternating current at a first set of windings, or coils, of the transmitting device generates an alternating current at a second set of windings of the receiving device, using mutual inductance. The receiving device, using a rectifier, converts the alternating current at the second windings to a direct current (DC) voltage. The DC voltage may then be stored in a battery or consumed at a load of the receiving device.

A potential safety issue may arise if the received power, at the receiving device, exceeds the power need of the receiving device component(s) (e.g., receiving elements, load elements, etc.). This may lead to situations in which the receiving elements exceed their operating limits.

It is typical for the transmitting device to generate more power than may be required by the receiving device. For instance, the transmitting device may be used to wirelessly transfer power to more than one receiving device. In this example, the transmitting device may generate sufficient power to support both receiving devices. As another example, the transmitting device may increase the power at the transmitting end to compensate for losses between the transmitting and receiving devices due to, for example, a mismatch between the two devices.

For various reasons, the receiving device may receive an excess of incoming power that exceeds the operating limits of the receiving device. For instance, a load element at the receiving device may be disconnected and the event may not be properly communicated to the transmitting device in a request to reduce the power level. Or the receiving device may be slightly repositioned in reference to the transmitting device, which may cause a change in an impedance at each coil. It is possible that the coupling between the two devices is now improved and the receiving device suddenly receives a large amount of power. As another example, a defect at the transmitting device may lead to excess power to be received by the receiving device.

Regardless of the cause, an excess of incoming power at the receiving device may lead to a presence of an excess voltage (i.e., over-voltage) across, or an excess current (i.e., over-current) through, the receiving and loading elements of the receiving device. The excess of incoming power may instantly, or gradually, damage the components of the receiving device, or even the components of the transmitting device, which may be additionally harmful and hazardous to the end-user. Accordingly, system and methods to ensure the safe operation of the wireless power transfer are desired.

Amplitude shift keying (ASK) modulation is a form of modulation that can be used for communication between the transmitting device and the receiving device. In ASK modulation, the carrier frequency signal is multiplied by a binary digital to form a variable amplitude signal and information is communicated in the form of the carrier's amplitude. The receiving device uses backscatter modulation, by modulating the power drawn from the transmitting device, to communicate with the transmitting device. In an exemplary communication protocol, the ASK modulation allows the receiving device to communicate with the transmitting device.

In previous solutions, the ASK modulation signal becomes erratic and the signal communicated from the receiving device to the transmitting device, for example, the end power transfer (EPT) request, becomes corrupted. As a result, the transmitting device may not be able to properly receive the communication from the receiving device and the EPT request may be ignored. This in turn may cause continued damage to one or both of the devices.

Embodiments of this disclosure provide a system and method to monitor an over-voltage condition in a receiving device of the wireless power system. In various embodiments, a monitoring circuit determines the over-voltage condition at the output of a rectifier and/or at the output of a voltage regulator. Each voltage may be compared to a threshold voltage to determine the over-voltage condition. In some embodiments, the monitoring circuit is used to determine whether the voltage at the output of the rectifier exceeds the voltage at the output of the regulator by a threshold voltage. In some embodiments, the monitoring circuit may use a combinational logic, based on direct or differential monitoring of the various voltages, to determine the over-voltage condition.

In response to determining that an over-voltage condition has occurred, a regulating circuit is used to regulate the voltage at the output of the rectifier. In the event of an over-voltage condition, the monitoring circuit provides a control voltage to the regulating circuit. The regulating circuit includes an active device coupled to a dissipating element. The input of the active device is coupled to a node shared between the output of the rectifier and the input of the voltage regulator. The output of the active device is coupled to a dissipating element connected to the reference ground. The conductivity of the active device is controlled by the value of the control voltage. As the conductivity of the active device changes, the amount that the dissipating element dissipates varies. The control voltage is set such the dissipating element only dissipates the amount needed to regulate the output of the rectifier to the steady-state operational condition. Advantageously, the excess power is spread at the load and the regulating circuit, which minimizes damage to each device.

Aspects of this disclosure provide a regulated voltage in the event of an over-voltage condition, permitting the receiving device to communicate the abnormal condition to the transmitting device using, for example, ASK modulation. The monitoring circuit and the regulating circuit form a regulation loop circuit that ensures proper in-band communication from the receiving device to and from the transmitting device. In some embodiments, the regulation loop circuit conditions the voltage at the input of the voltage regulator to a stable value for a period of time such that the receiving device can communicate a request to the transmitting device for a reduction in the level of the power transference. Thus, the various receiving and loading elements of the receiving device remain properly biased to allow the receiving device an opportunity to communicate with the transmitting device.

In some embodiments, the receiving device may send an end power transfer (EPT) request to the transmitting device after an elapsing of a specific period of time from the activation of the regulating circuit. This advantageously provides the wireless power system a period of time to ignore any short surges of incoming power from the transmitting device to the receiving device, and to ignore any faulty information which would result, for example, from noise originating from the detection system (e.g., de-bouncing system). Thus, providing a smooth reaction response to an excess input power condition at the receiving device. These and other details are discussed in greater detail below.

FIG. 1 illustrates a schematic diagram of a wireless power system 100. The wireless power system 100 includes a transmitting device no and a receiving device 120. The wireless power system 100 is used to wirelessly transfer power 140 from the transmitting device no to the receiving device 120. The transmitting device no may be a base station, such as a wireless charger, which provides inductive power. The receiving device 120 may be a mobile device, such as a personal computer (PC), a tablet, a cellular phone, a wearable communications device (e.g., a smartwatch, etc.), a toothbrush, an internet of things (IOTs) device, or others. The receiving device 120 consumes inductive power.

The transmitting device 110 may have a flat surface on which the receiving device 120 may be placed. The receiving device 120 may use guided positioning or free positioning to properly position the receiving device 120 with respect to the transmitting device 110.

The transmitting device no includes a power source 112, a supply-side capacitor 114, and first windings 116. The receiving device 120 includes second windings 122, a resonant capacitor 124, a rectifier 126, a shunt capacitor 128, a voltage regulator 130, and a load 132.

The power source 112 is any device that generates alternating current (AC) power supplied to the first windings 116. Each of the first windings 116 and second windings 122 may be a loop antenna or a magnetic antenna. The windings may include a physical core (e.g., ferrite core) or an air core. The windings may be implemented as an antenna strip or using a Litz wire. The resonant frequency of the windings is based on the shape and size of the looping wire or coil. In some embodiments, additional capacitance and inductance may be added to each winding to create a resonant structure at the desired resonant operating frequency.

The rectifier 126 is a device that converts an alternating current (AC) voltage to a direct current (DC) voltage. The rectifier 126 may be any type of rectifier, such as a low-impedance synchronous rectifier having full-wave or half-wave rectification. The rectifier 126 shown in FIG. 1 is a bridge rectifier, however, other types of rectifiers may also be contemplated.

The shunt capacitor 128 may be referred to as a smoothing or a reservoir capacitor. The shunt capacitor 128 is used to decrease any ripple at the input of the voltage regulator 130 from the rectifier 126. A terminal of the shunt capacitor 128 is shared with the output terminal of the rectifier 126 and an input terminal of the voltage regulator 130 at the $V_{RECT}$ node 220. The second terminal of the shunt capacitor 128 is connected to the reference voltage $V_{REF}$ at the $V_{REF}$ node 160. Additional filtering components may be contemplated.

The voltage regulator 130 is a device that maintains a constant output voltage for the load 132. The voltage regulator 130 receives an input voltage from the rectifier 126. The voltage regulator 130 may be any type of voltage regulator, such as a linear regulator (e.g., low drop-out (LDO) linear regulator).

In some embodiments, the rectifier 126 and voltage regulator 130 may be part of a switched-mode power supply (SMPS) circuit.

The transferred power is received at the load 132. The load 132 may be a charge storage device, such as a battery. For instance, the load 132 may be a battery of a cellular phone. The transmitting device may be a charging pad and the cellular phone may be placed on the charging pad. The charging pad transfers wireless power to the battery of the cellular phone without the need for interconnecting cables between the two devices.

The power source 112 generates an alternating current (AC) at the first windings 116, which induces a magnetic field at the second windings 122, typically at a specified distance. The induced magnetic field in turn induces an alternating current at the second windings 122 through mutual coupling. The rectifier 126 converts the AC voltage at the second windings 122 to a direct current (DC) voltage. The voltage regulator 130 converts the DC voltage to match a desired DC voltage for the load 132.

The receiving device 120 can communicate with the transmitting device 110, for example, to properly adjust the power received at the receiving device 120. A number of interface standards have been developed with the goal of standardizing wireless power transfer and related functions. For instance, Qi, which is promoted by the Wireless Power Consortium (WPC), and Rezence, which is promoted by the AirFuel Alliance are two competing standards that define interface standards for wireless power transfer. These and other similar types of protocols may be used to define the communication interface for adjusting the power supplied by the transmitting device no and demanded by the receiving device 120. For instance, the receiving device 120 may request, from the transmitting device 110, a change (e.g., an increase or decrease) in the amount of power that is being received. The receiving device 120 may communicate with the transmitting device using an in-band (e.g., Qi) or an out-of-band (e.g., AirFuel Alliance) communication path. In-band communication refers to signaling over the power path and/or at the same frequency as the power transfer. Out-of-band communication path refers to signaling over a different channel and/or at a different frequency than the power transfer.

The transmitting device no may change the amount of power that is being generated by the power source 112 as a result of an instruction received in a signal, or packet, 150 from the receiving device 120. Thus, a feedback loop system may be utilized to adjust the amount of power transferred from the transmitting device no to the receiving device 120. However, when the receiving device 120 becomes exposed to an excessive amount of power at the second windings 122, a period of time may elapse before the transmitting device no receives the instructions and acts to reduce the power received at the receiving device 120. Additionally, the transmitting device 110 may not properly receive an updated request to reduce the power level due to, for example, a corrupt signal exchange.

As an example, the transmitting device no may be capable of providing up to 30 Volts (V) at the rectifier 126. The receiving device 120 may be operating stably and receiving more than 10 V at the rectifier 126. Imagine that an end-user quickly substitutes the receiving device 120 with a new receiving device, and where the new receiving device does not have an initial load. In this scenario, the transmitting device 110 is still transmitting with the assumption that the device receiving the power is the old receiving device 120. Immediately after this transition, the new receiving device, without the initial load, will be exposed at a high voltage at its corresponding rectifier. The new receiving device, to protect itself against over-voltage, may clamp this high voltage. As a result of the clamping, packets sent from the new receiving device may now be corrupted. A request to reduce the power to the transmitting device 110 using the corrupt packets may not be properly received at the transmitting device no. Accordingly, the new receiving device may be exposed to a large amount of power for an extended period of time, which may result in damage to various components in the new receiving device.

As another example, the receiving device 120, with established receiving power transmitted from the transmitting device no, may replace a second receiving device, with higher established receiving power previously from a second transmitter in a second wireless power system. In this example, the receiving device 120 would be exposed to a higher power in the second wireless power system.

FIG. 2 is a schematic diagram of an embodiment wireless power system 200 having a regulation loop circuit 240. The wireless power system 200 is used to provide a regulated voltage from the transmitting device no to the load 132. The regulation loop circuit 240 provides protection against over-voltage conditions at the load or receiving elements of the receiving device 120. Moreover, the regulation loop circuit 240 allows proper ASK modulation signaling to communicate the over-voltage condition from the receiving device 120 to the transmitting device no.

The receiving device 120 in the wireless power system 200, in addition to the components previously discussed in FIG. 1, includes a first differential amplifier 202, a second differential amplifier 204, a comparator 206, a switch 208, a regulating circuit 210, and a microcontroller 212, which may (or may not) be arranged as shown in FIG. 2. The transmitting device no in the wireless power system 200, in addition to the components previously discussed in FIG. 1, includes a microcontroller 214, which may (or may not) be arranged as shown in FIG. 2. The receiving device 120 and the transmitting device no may include additional components not depicted in FIG. 2, such as long-term storage (e.g., non-volatile memory, etc.), a non-transitory computer-readable medium, one or more antenna elements, filter circuits, and impedance matching circuits.

The microcontroller 212 is coupled to the various components of the receiving device 120. The microcontroller 214 is coupled to the various components of the transmitting device no. The microcontrollers 212 and 214 may be a part of a communications and control unit of each device. Microcontrollers 212 and 214 regulate the transferred power from the transmitting device no to the level requested by the receiving device 120. Communication between the microcontrollers 212 and 214 may be unidirectional or bi-directional. Furthermore, the communication may be in-band or out-of-band to the wireless power transfer frequency. In various embodiments, the communication may be in accordance with a standard protocol interface, such as that promoted by the wireless power consortium (i.e., Qi).

The output of the rectifier 126, the input of the voltage regulator 130, and a first terminal of the shunt capacitor 128 share the rectified voltage ($V_{RECT}$) node 220. The output of the voltage regulator 130 and the input of the load 132 share the regulated output voltage ($V_{OUT}$) node 230. The voltage at the $V_{RECT}$ node 220 is referred to as $V_{RECT}$. The voltage at the $V_{OUT}$ node 230 is referred to as $V_{OUT}$.

Each of the differential amplifiers 202 and 204 receive a pair of input voltages at a corresponding pair of input terminals. Each differential amplifier provides an amplified difference of the two input voltages at its output. In some embodiments, one or both of the differential amplifiers 202 and 204 may be an operational amplifier (op-amp) configured for providing gain.

For example, the first differential amplifier 202 may be an op-amp configured for providing unity gain, while the second differential amplifier 204 may be another op-amp configured for providing a high gain (e.g., >20 decibels (dB)). This configuration advantageously ensures that the regulation loop circuit 240 has enough open loop gain for proper and reliable operation. The regulation loop circuit 240 is discussed in further detail below.

A first (i.e., non-inverting) input of the first differential amplifier 202 is coupled to the $V_{RECT}$ node 220. A second (i.e., inverting) input of the first differential amplifier 202 is coupled to the $V_{OUT}$ node 230. It should be noted that in some embodiments the $V_{RECT}$ node 220 may be coupled to the inverting input of the first differential amplifier 202 and the $V_{OUT}$ node 230 may be coupled to the non-inverting input of the first differential amplifier 202. It is typical for a person of ordinary skill in the art (POSITA) to configure the individual gains such that the overall feedback is a negative feedback.

An output of the first differential amplifier 202 provides an amplified difference between the voltages $V_{RECT}$ and $V_{OUT}$. In some embodiments, the output of the first differential amplifier 202 may be a non-amplified (i.e., gain of 0 dB) difference between the voltages $V_{RECT}$ and $V_{OUT}$.

A first (i.e., non-inverting) input of the second differential amplifier 204 is coupled to the output of the first differential amplifier 202. A second (i.e., inverting) input of the second differential amplifier 204 is coupled to a first reference voltage ($V_{REF_1}$). Similar to the case of the first differential amplifier 202, the input signals to the inverting and non-inverting inputs of the second differential amplifier 204 may be swapped while maintaining overall loop stability.

An output of the second differential amplifier 204 provides an amplified difference between the output voltage of the first differential amplifier 202 and the voltage $V_{REF_1}$. In some embodiments, the output of the second differential amplifier 204 may be a non-amplified (i.e., gain of 0 dB) difference between the output voltage of the first differential amplifier 202 and the voltage $V_{REF_1}$. The output of the second differential amplifier 204 may correspond to one or more of the gain of the first differential amplifier 202, the gain of the second differential amplifier 204, and the value of $V_{REF_1}$. In other words, the output voltage of the second differential amplifier 204 is configurable using several controllable parameters. Generally speaking, the overall regulation loop gain is configured, such that by the distribution of the gain between the first differential amplifier 202, the second differential amplifier 204—and to an extent—the regulating circuit 210, the overall regulation loop is provided sufficient gain to ensure proper regulation and stability.

The comparator 206 receives a pair of input voltages (or currents) and provides a digitized output (i.e., "0" or "1"), at a specific voltage, based on a comparison of the value at the two inputs. For example, a comparator may have a positive side input and a negative side input. In this example, the output voltage may indicate a digital representation of "1" if the voltage at the positive side is greater than the voltage at the negative side and indicate a digital representation of "0" if the voltage at the negative side is greater than the voltage at the positive side, or vice-versa.

A first (i.e., positive-side) input of the comparator 206 is coupled to the output of the first differential amplifier 202. A second (i.e., negative-side) input of the comparator 206 is coupled to a second reference voltage ($V_{REF_2}$). It should be noted in some embodiments, the input voltages at the positive side and the negative side of the comparator 206 may be swapped.

Switch 208 can be, but is not limited to, a field-effect transistor (FET) or a bipolar junction transistor (BJT). A FET can be a metal-oxide-semiconductor FET (MOSFET), a junction FET (JFET), an insulated-gate bipolar transistor (IGBT), or any other semiconductor device used as a switch. The FET device may be a negative-type or a positive-type FET. For instance, the switch 208 may be an n-MOSFET, p-MOSFET, or the like.

An input of switch 208 is coupled to the output of the second differential amplifier 204. Switch 208 includes a control terminal (e.g., gate terminal in a FET) that receives a control voltage from an output of the comparator 206. An output of switch 208 is coupled to the regulating circuit 210.

Switch 208 operates in either open or closed mode. In the close mode, switch 208 provides a voltage ($V_{CONT}$), at the $V_{CONT}$ node 250, from the second differential amplifier 204 to the regulating circuit 210. In the open mode, switch 208 blocks the voltage $V_{CONT}$ from the second differential amplifier 204 to be received at the regulating circuit 210. In an embodiment, switch 208 may operate as normally open. In an embodiment, $V_{CONT}$ may have a value from about −0.3 V to about 27 V.

The regulating circuit 210 receives the voltage W ENT from switch 208. The regulating circuit 210 regulates the voltage at the $V_{RECT}$ node 220 based on the value of the voltage $V_{CONT}$. In an embodiment, excess power is dissipated from the $V_{RECT}$ node 220 through the regulating circuit 210. In one embodiment, the regulating circuit 210 may be a discrete component. In some embodiments, the regulating circuit 210 may include at least one active component. In some embodiments, the regulating circuit 210, in addition to the at least one active component, may include one or more active or passive components. These and other details of the regulating circuit 210 are discussed further below in reference to FIG. 4.

The differential amplifiers 202 and 204, the comparator 206, the switch 208, and the regulating circuit 210 form a regulation loop circuit 240. The regulation loop circuit 240, in response to determining that the value of $V_{RECT}$ exceeds an operational limit of the receiving device 120, utilizes the regulating circuit 210 to dissipate the excess power from the $V_{RECT}$ node 220. The regulation loop circuit 240 includes a 1) monitoring circuit, comprising the differential amplifiers 202 and 204, the comparator 206, and the switch 208, and 2) the regulating circuit 210.

In other words, the regulation loop circuit 240 is used to detect whether or not $V_{RECT}$, which is the input voltage to the voltage regulator 130, is causing the voltage across the voltage regulator 130 to exceed a threshold limit set for the system. In response to determining that this threshold has been exceeded, the regulating circuit 210 is activated. The controlled activation of the regulating circuit 210 allows the reduction of $V_{RECT}$ to a value at which the voltage regulator 130 and load 132 can remain in the proper operational voltage.

In an original steady-state operation, or proper operational mode (i.e., when $V_{RECT}$ is within normal operating conditions), the voltage regulator 130 provides a properly regulated voltage at the $V_{OUT}$ node 230 to load 132. For example, the value of $V_{RECT}$ may be about 20.5 V while the value of $V_{OUT}$ may be about 20 V. In an excess of incoming power condition, $V_{RECT}$ increases, and the regulating circuit 210 in the regulation loop circuit 240 is activated. As a result, $V_{RECT}$ is clamped at about 22 V. The wireless power system 200 is now operating in a new steady-state operational mode and the voltage regulator 130 continues to provide a properly regulated voltage $V_{OUT}$. It is noted that the regulating circuit 210 absorbs the excess of power.

The value of the $V_{REF_2}$ voltage is set such that the switch 208 remains open as long as the amplified difference between $V_{RECT}$ and $V_{OUT}$ is less than an operational threshold of the receiving device 120. If the amplified difference between $V_{RECT}$ and $V_{OUT}$ exceeds the operational threshold of the receiving device 120, the switch 208 is closed and the output of the second differential amplifier 204 provides a control signal to the regulating circuit 210 relative to the desired amount of excess power that is to be dissipated from the $V_{RECT}$ node 220 to reduce $V_{RECT}$ in line with the operational parameters of the receiving device 120. In an embodiment, the value of $V_{REF_2}$ may be set in about 0.5 V steps from about 2.5 V up to about 4 V. The gain of the first differential amplifier 202 may be set to about 0 dB. The value of $V_{REF_2}$ and the gain of the differential amplifier may be a programmable value that is configurable using, for example, the microcontroller 212.

The regulation loop circuit 240 may continue to dissipate the excess power through the regulating circuit 210, to provide sufficient time for the receiving device 120 to communicate a clear signal 150 to the transmitting device 110 and request a reduction of the transfer power 140.

Advantageously, the embodiments of this disclosure allow the receiving device 120 to use in-band communication to communicate with the transmitting device 110 without the packet corruption that may occur as a result of, for example, with detuning or a hard over-voltage protection method.

Additionally, the regulation loop circuit 240 is advantageously capable of effectively clamping at any programmable voltage. This is in contrast to the clamping operation using Zener diodes, which is rigid and not configurable.

Furthermore, the effective clamping process in the embodiments of this disclosure is an active process. Thus, the regulation loop circuit 240 is able to release the clamping at any time, which again is different from a clamping operation using Zener diodes.

In some embodiments, the activation of switch 208 may trigger a signal to be received at the microcontroller 212. In turn, the microcontroller may provide a packet to be transmitted to the transmitting device no to request a reduction in, or to end, the power transfer.

It should be noted that some excess power may be dissipated at the voltage regulator 130 due to the range of input voltages at which the voltage regulator 130 is capable of providing a stable output voltage to the load 132.

In an exemplary embodiment, the steady-state value of $V_{OUT}$ is 20 V, the gain of the first differential amplifier 202 and the second differential amplifier 204 is 0 dB, the value of $V_{REF_2}$ is set to 4 V, and the value of $V_{REF_1}$ is set to 2 V. In a first scenario of this exemplary embodiment, and in proper operational mode, $V_{RECT}$ is at 20 V and the output of the first differential amplifier 202 is near 0 V. As the output of the first differential amplifier 202 is less than 4 V, the switch 208 remains open, the regulating circuit 210 is inactive, and $V_{RECT}$ remains at 20V.

In a second scenario of the above exemplary embodiment, $V_{RECT}$ exceeds 24 V and the output of the first differential amplifier 202 is now greater than 4 V. As the output of the first differential amplifier 202 exceeds 4 V, the switch 208 is now closed. The second differential amplifier 204 provides a control signal to the regulating circuit 210 such that $V_{RECT}$ remains at about 24 V. The regulating circuit 210 dissipates a corresponding amount of power from the $V_{RECT}$ node 220, which stabilizes the value of $V_{RECT}$.

In an embodiment, the rectifier 126, the voltage regulator 130, the microcontroller 212, the differential amplifiers 202 and 204, the comparator 206, and the switch 208 may be formed in an integrated circuit (IC). Optionally, the integrated circuit may have additional components (not shown), such as a memory, a clock generator, a thermal protection circuit, an analog-to-digital converter (ADC), or the like. The memory may store an operating system, communication or configuration instructions. The clock generator may generate a clock signal to synchronize operations within the integrated circuit or the receiving device. The thermal protection circuit may be used to monitor, and protect against, over-heating conditions in the integrated circuit.

The integrated circuit may provide a highly efficient and low-power dissipating packaged circuit capable of integration in compact applications. The integrated circuit may have a plurality of terminals to connect to external discrete components, such as capacitors, resistors, inductors, or windings. In an embodiment, the integrated may be packaged in a flip-chip configuration. The integrated circuit may have terminals to interconnect the output of the switch 208 to the regulating circuit 210 and to conditionally provide the voltage WONT. The integrated circuit may support a variety of standard or proprietary standards, such as the single wire protocol (SWP) interface, the serial peripheral interface (SPI), and the inter-integrated circuit (I2C) interface.

The IC provides a highly efficient and low-power dissipating circuit that is capable of integration in compact applications. The IC may comply with one or more wireless standard communication protocols, such as the Qi or AirFuel standards. The thermal protection circuit may detect that one or more of the components in the receiving device have exceeded a thermal threshold and trigger a signal to the microcontroller 212. The microcontroller 212, in response to receiving the trigger from the thermal protection circuit, and any other trigger, for example from the switch 308, may transmit a packet to the transmitting device to reduce, or end, the power transfer.

Figure 3:
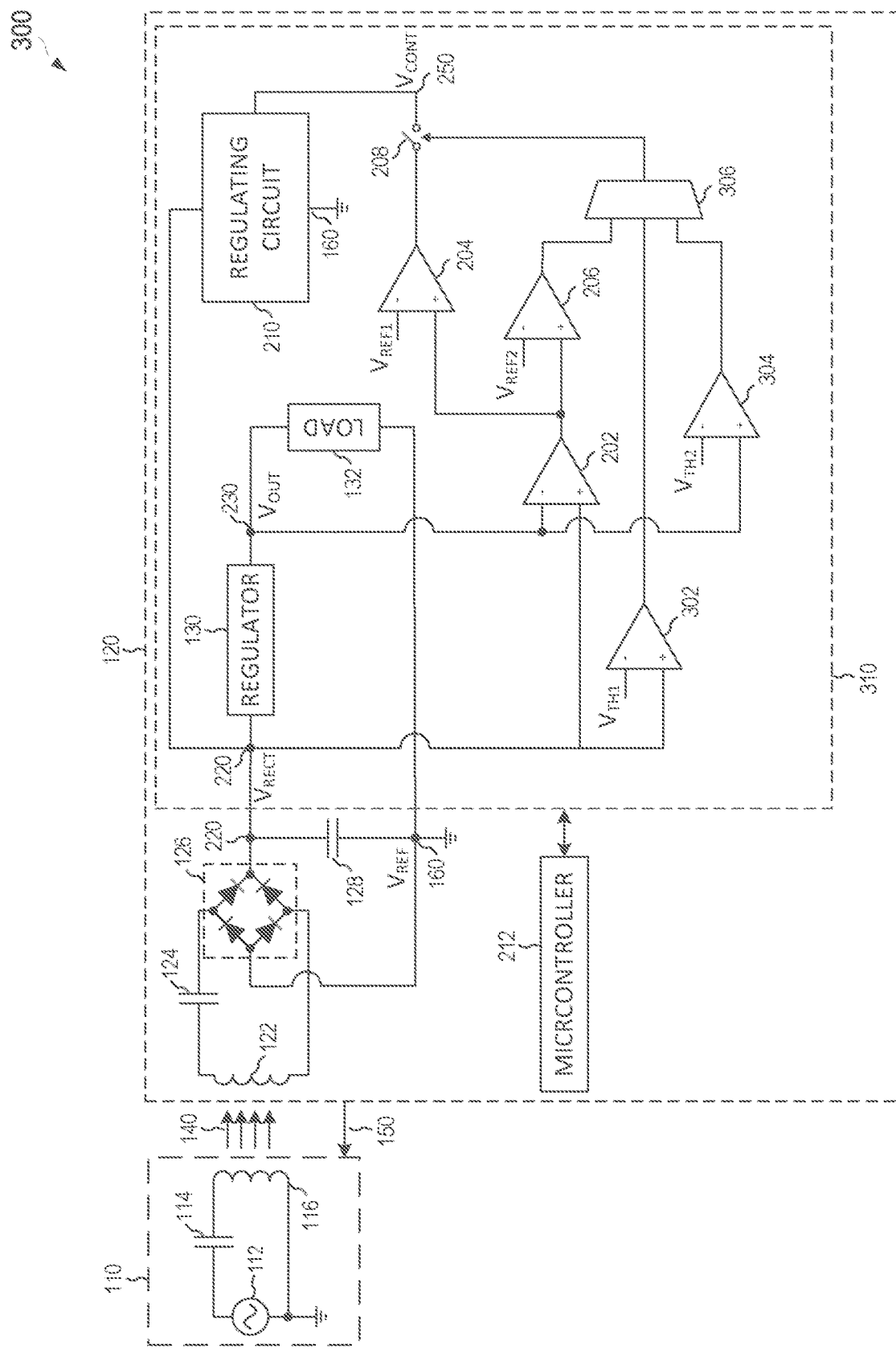
FIG. 3 is a schematic diagram of another embodiment wireless power system having a regulation loop circuit.

FIG. 3 is a schematic diagram of an embodiment wireless power system 300 having a regulation loop circuit 310. The regulation loop circuit 310, similar to the regulation loop circuit 240, provides protection against over-voltage conditions at the load or receiving elements of the receiving device 120. However, switch 208 in the regulation loop circuit 310 is activated in response to a trigger from the multiplexer 306 based on any configured combinational logic of a) the difference between the voltages $V_{RECT}$ and $V_{OUT}$, b) the difference between the voltages $V_{RECT}$ and a first threshold ($V_{TH_1}$), and c) the difference between the voltages $V_{OUT}$ and a second threshold ($V_{TH_2}$).

The regulation loop circuit 310, in addition to the components previously discussed in FIG. 2, includes two additional comparators 302 and 304 and a multiplexer 306, which may (or may not) be arranged as shown in FIG. 3. The receiving device 120 and the transmitting device no may include additional components not depicted in FIG. 3, such as long-term storage (e.g., non-volatile memory, etc.) or a non-transitory computer-readable medium. The regulation loop circuit 240 includes a 1) monitoring circuit, comprising the differential amplifiers 202 and 204, the comparators 206, 302, and 304, the multiplexer 306, and the switch 208, and 2) the regulating circuit 210.

Comparators 302 and 304 are functionally similar to comparator 206 of FIG. 2. A first (i.e., positive-side) input of the comparator 302 is coupled to $V_{RECT}$ node 220. A second (i.e., negative-side) input of the comparator 302 is coupled to $V_{TH_1}$. A first (i.e., positive-side) input of the comparator 304 is coupled to $V_{OUT}$ node 230. A second (i.e., negative-side) input of the comparator 304 is coupled to $V_{TH_2}$. It should be noted that in some embodiments, the input voltages at the positive side and the negative side of comparators 302 and 304 may be swapped. The values of the threshold voltages $V_{TH_1}$ and $V_{TH_2}$ are selected, respectively, in accordance with the steady-state operational mode values at the $V_{RECT}$ node 220 and the $V_{OUT}$ node 230. In an embodiment, the values $V_{TH_1}$ and $V_{TH_2}$ may be programmable through the microcontroller 212 and set from 23 V up to 26.5 V, in 0.5 V increments.

The multiplexer 306 is coupled to the output of each comparator 206, 302, and 304. The multiplexer 306 receives an output signal from each comparator 206, 302, and 304, and provides an activation signal to switch 208. Therefore, the multiplexer 306 may be configured to provide an activation signal to switch 208 based on the voltage $V_{RECT}$ exceeding $V_{OUT}$ by a value greater than $V_{REF_2}$, the voltage $V_{RECT}$ exceeding $V_{TH_1}$, the voltage $V_{OUT}$ exceeding $V_{TH_2}$, or a combination thereof. The regulation loop circuit 310 advantageously provides over-voltage monitoring by directly monitoring the voltages $V_{RECT}$ and $V_{OUT}$ in addition to monitoring the voltage difference between $V_{RECT}$ and $V_{OUT}$.

The multiplexer 306 may be configured using the microcontroller 212. The microcontroller 212 may include a memory component that stores various configuration settings. The various configuration settings may be selected such that the multiplexer 306 provides a trigger to activate switch 208 based on any logical combination of signals received from the comparators 206, 302, and 304. The various configuration settings may be pre-programmed at the multiplexer or programmed through, for example, a firmware update.

In an exemplary embodiment, the steady-state value of $V_{OUT}$ is about 20V, the gain of the first differential amplifier 202 is about 0 dB and the second differential amplifier 204 is 20 dB, the value of $V_{REF_2}$ is set to about 4V, the value of $V_{REF_1}$ is set to about 4V, and the values of $V_{TH_1}$ and $V_{TH_2}$ are set to about 24 V. In a first scenario of this exemplary embodiment, and in proper operational mode, $V_{RECT}$ is at about 20V and the output of the first differential amplifier 202 is near 0 V. The output of comparators 206, 302, and 304 remains low. The output of the multiplexer 306 remains low and the switch 208 remains open, the regulating circuit 210 is inactive, and $V_{RECT}$ remains at about 20V.

In a second scenario of the above exemplary embodiment, $V_{RECT}$ exceeds 24V. The output of the first differential amplifier 202 is greater than 4 V. The output of the comparators 206, 302, and 304 are high and switch 208 is closed. The second differential amplifier 204 provides a control signal to the regulating circuit 210. The regulating circuit 210 is enabled and dissipates a corresponding amount of power from $V_{RECT}$, which reduces the value of $V_{RECT}$.

This solution advantageously provides a reliable and multi-angled approach to the monitoring of an over-voltage condition in the receiving device 120. This solution may counteract a situation at which VOUT and VRECT may experience an uncorrelated behavior and the regulation loop circuit is configured to properly activate.

In an embodiment, the rectifier 126, the voltage regulator 130, the microcontroller 212, the differential amplifiers 202 and 204, the comparators 206, 302, and 304, the multiplexer 306, and the switch 208 may be formed in an integrated circuit (IC). Optionally, the integrated circuit may have additional components (not shown), such as a memory, a clock generator, a thermal protection circuit, an analog-to-digital converter (ADC), or the like. The integrated circuit may have terminals to interconnect with the regulating circuit 210 and to conditionally provide the voltage $V_{CONT}$. The integrated circuit may have a plurality of terminals to connect to external discrete components, such as capacitors, resistors, inductors, or windings. In an embodiment, the integrated may be packaged in a flip-chip configuration. The integrated circuit may have terminals to interconnect the output of switch 208 to the regulating circuit 210 and to conditionally provide the voltage $V_{CONT}$.

FIG. 4 is a schematic of an embodiment regulating circuit 210 for a wireless power system. The regulating circuit 210 includes an active device 410 and a dissipating element 420. The active device 410 receives a voltage $V_{CONT}$ when switch 208 is activated. The value of $V_{CONT}$ is set such that the active device 410 has only enough conductivity to dissipate a specific amount of excess energy from $V_{RECT}$ and to set the voltage at the $V_{RECT}$ node 220 to normal operating conditions. The excess energy is dissipated through the dissipating element 420 to reference ground at the $V_{REF}$ node 160 and additionally through the voltage regulator 130.

The active device 410 has an input terminal 412, an output terminal 414, and a control terminal 416. The input terminal 412 is coupled to the $V_{RECT}$ node 220, the output terminal 414 is coupled to the dissipating element 420, and the control terminal 416 is coupled to the $V_{CONT}$ node 250. In an embodiment, the active device 410 is a MOSFET. In some embodiments, the active device 410 may be a set of active devices.

The active device 410 is controlled through the voltage $V_{CONT}$ at the control terminal 416. The active device 410 operates linearly and the conductivity of the active device 410 depends on the value of the voltage $V_{CONT}$. The voltage $V_{CONT}$ is provided from the second differential amplifier 204, as shown, for example, in the wireless power system 200 of FIG. 2.

In some embodiments, the dissipating element 420 may include one or more additional active devices. Optionally, in such embodiments, a source resistor may be coupled between the active device 410 and the one or more additional active devices to provide a smooth crossover between the active devices. As an example, the dissipating element 420 may include a silicon-controlled rectifier (SCR) or other similar types of semiconductor devices.

In some embodiments, the dissipating element 420 may be formed as one or more discrete components. In other embodiments, the dissipating element 420 may be formed in one or more integrated circuits (ICs). In one embodiment, the dissipating element 420 includes one or more resistors.

The active device 410 is biased such that as the active device 410 becomes conductive, the dissipating element 420 begins to sink current to ground. The value of the voltage $V_{CONT}$ is set such that only as much current as is necessary is sunk to ground to provide a regulated voltage at the $V_{RECT}$ node 220.

When the wireless power system is operating at a steady-state mode (e.g., $V_{RECT}$ is close to $V_{OUT}$), the value of the voltage $V_{CONT}$ is set such that the active device 410 is not conducting and the regulating circuit 210 is not dissipating any current through the dissipating element 420.

Figure 5A:
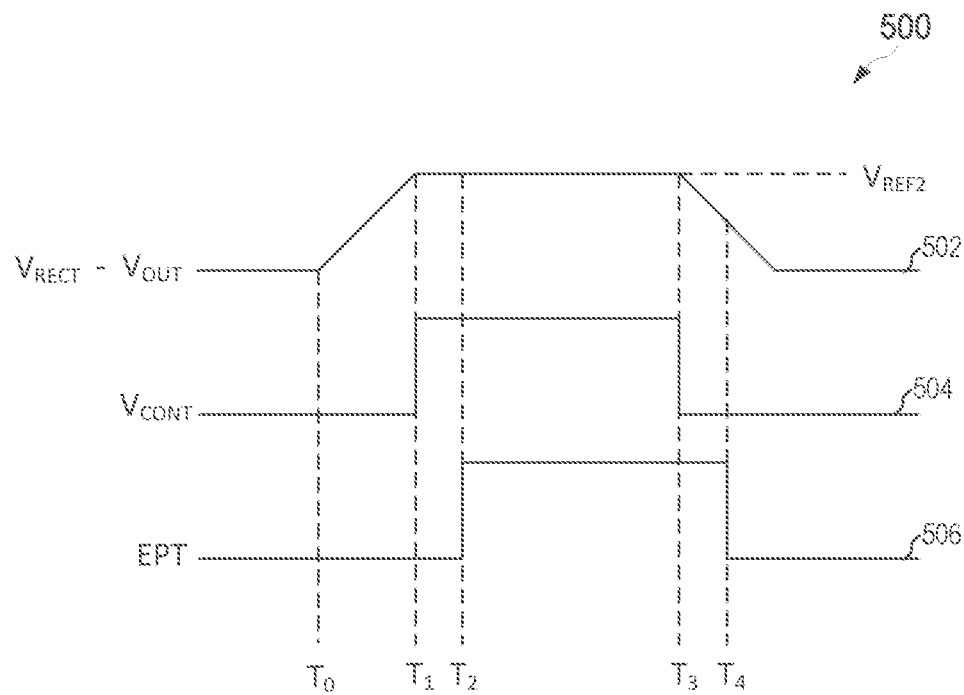
FIGS. 5A-C are plots of embodiment operational timing diagrams.
Figure 5B:
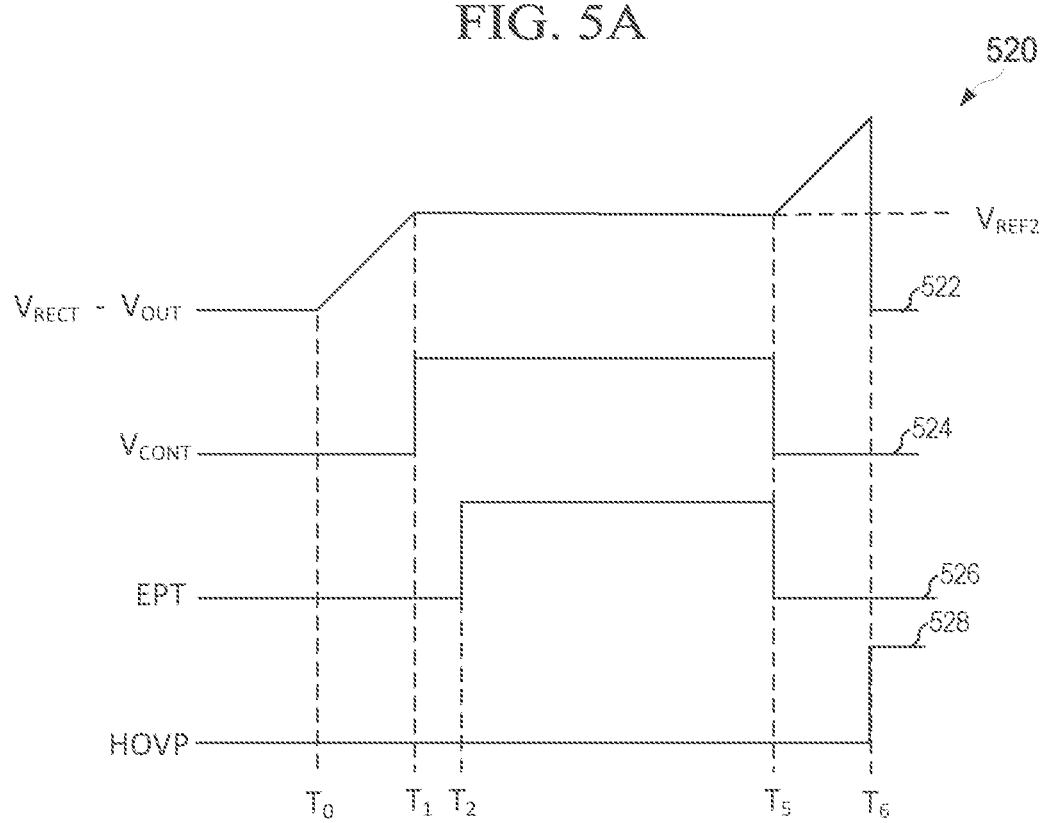
Figure 5C:
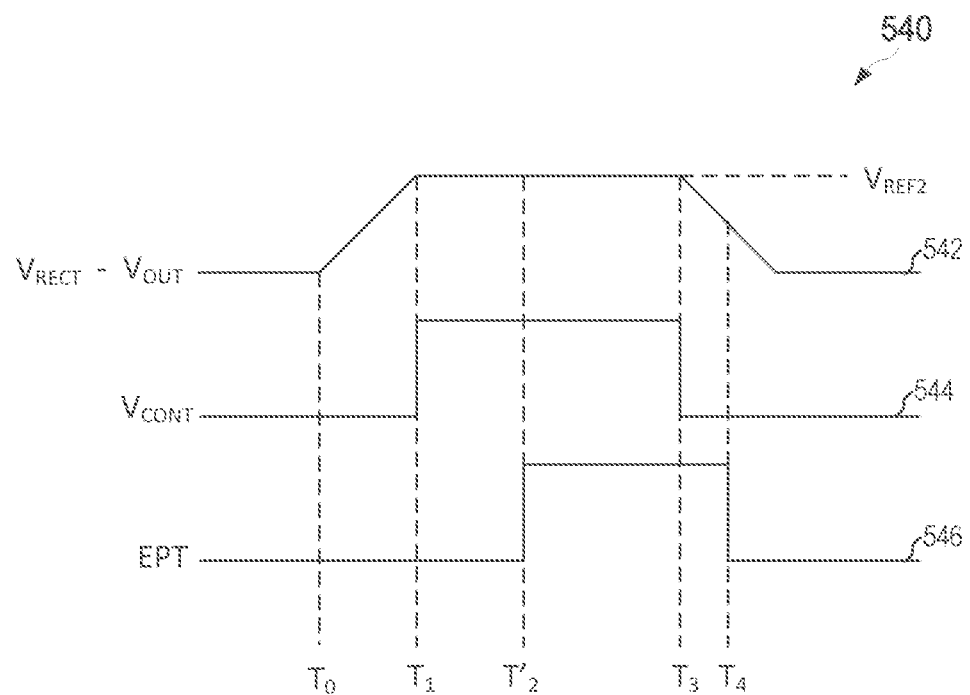

FIGS. 5A-C are plots of embodiment operational timing diagrams, as may be performed by a receiving device in accordance with the embodiments of this disclosure. In each timing diagram, at time $T_0$, an event occurs where the output power of the transmitting device begins to exceed the steady-state operational voltage of the receiving device. At time $T_1$, the difference in value between the two voltages $V_{RECT}$ and $V_{OUT}$ exceeds the voltage $V_{REF_2}$ (see plot 502), at which time the switch 208 is activated and the voltage $V_{CONT}$ is provided to the regulating circuit 210 (see plot 504).

FIG. 5A is a plot of an embodiment operational timing diagram 500 in a first operational scenario. In the first operational scenario, the receiving device 120 at time $T_2$, shortly after the activation of the switch 208 and the activation of the regulating circuit 210 at time $T_1$, transmits an end power transfer (EPT) request to the transmitting device (see plot 506). Between time $T_2$ and time $T_3$, the transmitting device receives the EPT request and the power transmission is successfully halted. In response, at time $T_3$, the difference in value between the voltages $V_{RECT}$ and $V_{OUT}$ falls below $V_{REF_2}$ (see plot 502), at which time the switch 208 is deactivated and the voltage $V_{CONT}$ is no longer provided to the regulating circuit 210 (see plot 504). Shortly thereafter, at time $T_4$, the receiving device stops the EPT request transmission (see plot 506).

FIG. 5B is a plot of an embodiment operational timing diagram 520 in a second operational scenario. In the second operational scenario, the receiving device 120 at time $T_2$, shortly after the activation of the switch 208 and the activation of the regulating circuit 210 at time $T_1$ (see plot 522), transmits an end power transfer (EPT) request to the transmitting device (see plot 526). However, unlike the first operational scenario, the EPT request is unsuccessful and the power transmission is not halted (see plot 526).

The switch 208 remains activated and the voltage $V_{CONT}$ continues to be provided to the regulating circuit 210. Until at time $T_5$, at which time the switch 208 is deactivated and the amplified difference in value between the two voltages $V_{RECT}$ and $V_{OUT}$ begins to increase (see plot 522). Until at time $T_6$ when, for example, a more drastic protection scheme like hard over-voltage protection is applied at the receiving device 120 (see plot 528). This results in the shutting down of the receiving device at risk of deterioration of the receiving device and/or the transmitting device, but that may be used as an ultimate countermeasure. The time period between time $T_5$ and time $T_1$ may be set as a configurable (i.e., programmable) option using the microcontroller 212 or a similar component. In some embodiments, the time period may be set anywhere from as little as 50 milliseconds (ms), up to 300 ms.

The wireless power system advantageously allows for the system to return to steady-state mode within the time period $T_1$ and $T_5$. If the wireless power system, however, does not return to steady-state mode (i.e., the original steady-state mode before the surge of incoming power) within that period of time, the hard over-voltage protection is applied at time $T_6$, to protect the wireless power system from further damage. The difference in time between time $T_6$ and $T_1$, or time $T_6$ and $T_5$, may be a configurable option.

FIG. 5C is a plot of an embodiment operational timing diagram 540 in a third operational scenario. In the third operational scenario, the receiving device waits until time $T'_2$ to transmit the end power transfer (EPT) request to the transmitting device (see plot 544). The delay, advantageously allows the wireless power system to remain operational in the event that a surge in power occurs for a short period of time (i.e., less than $T'_2-T_1$). For instance, if the surge in power occurs for a period of time that is less than the delay, the receiving device does not send the EPT request. The delay may be a configurable option using the microcontroller 212. In some embodiments, the delay may be from about 1 microseconds (μs) to about 10 μs.

Figure 6:
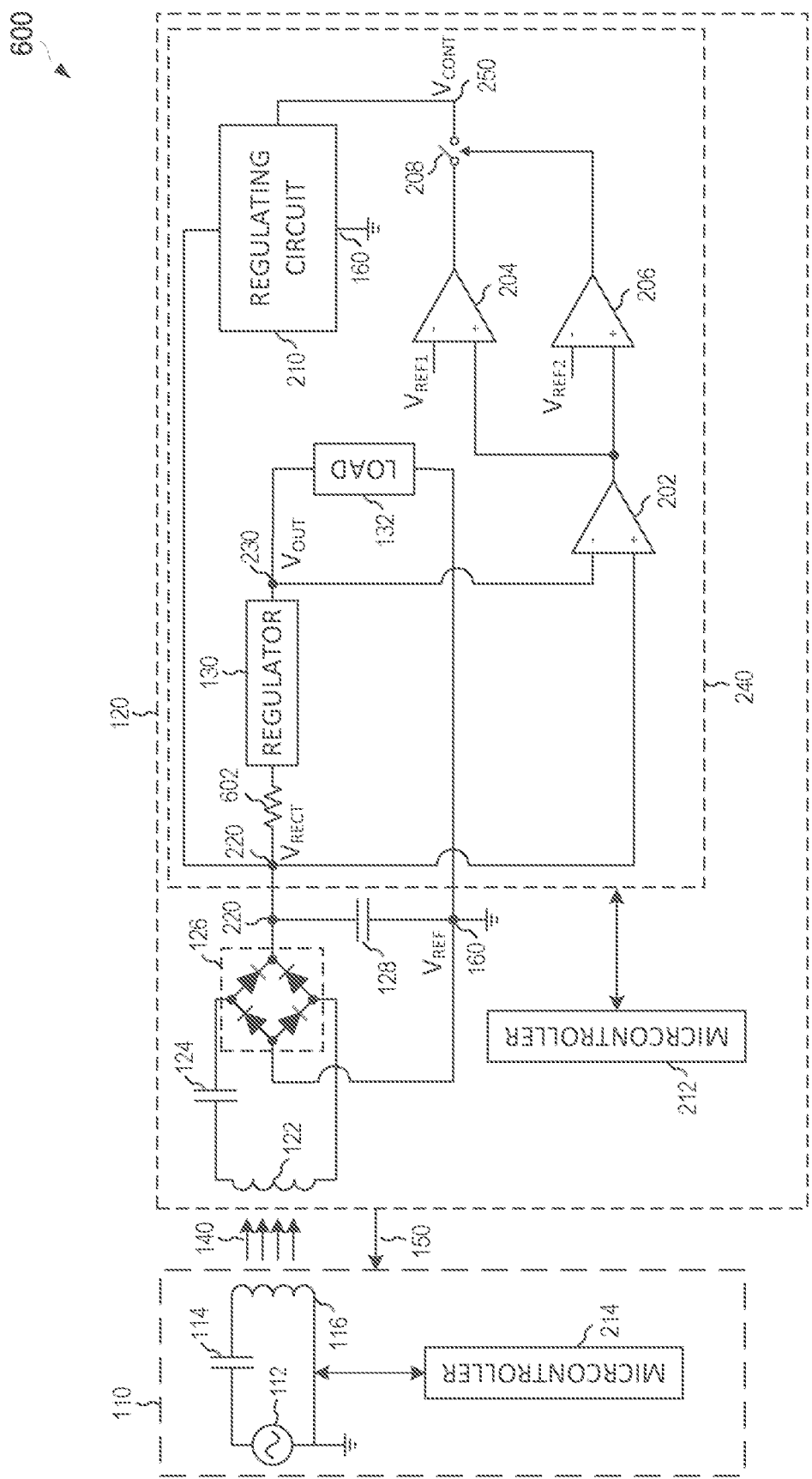
FIG. 6 is a schematic diagram of an embodiment wireless power system having a current sensing element.

FIG. 6 is a schematic diagram of an embodiment wireless power system 600 having a current sensing element 602. The wireless power system 600, similar to the wireless power systems 200 and 300, provides over-voltage protection at the load and receiving elements of the receiving device 120. The wireless power system 600, in additional to the components previously disclosed in FIG. 2, includes the current sensing element 602, which may (or may not) be arranged as shown. As shown, the current sensing element 602 is a resistor. However, other components may be contemplated to serve a similar function.

The current sensing element 602 is coupled in series between the output of the rectifier 126 and the input of the voltage regulator 130. The input node of the regulating circuit 210 is coupled between the output of the rectifier 126 and the current sensing element 602.

A current-sensing amplifier, for example in the microcontroller 212, can be used to monitor and accurately measure the voltages across the current sensing element 602 and the power at the receiving device 120. The receiving device 120 may communicate the level of power at the current sensing element 602 to the transmitting device 110, for example, in response to a foreign objection detection (FOD) check by the transmitting device 110.

In one embodiment, the transmitting device 110 can compare the power received at the receiving device with the power being transmitted. The transmitting device 110 may then determine that a power loss condition has occurred at the receiving device 120 to shut down the power transfer.

Indeed, as the regulating loop circuit 240—and in particular, the regulating circuit 210—is placed before the current sensing element, any power absorbed by the regulating circuit 210 is not taken into account in the power reported by the microcontroller 212. Thus, in the event that the microcontroller 214 of the transmitting device 110 prompts the receiving device 120 to report power, and make a comparison, the microcontroller 214 may resolve that some power is lost at the receiving device 120 and determine that a foreign object device (FOD) condition is present.

Figure 7A:
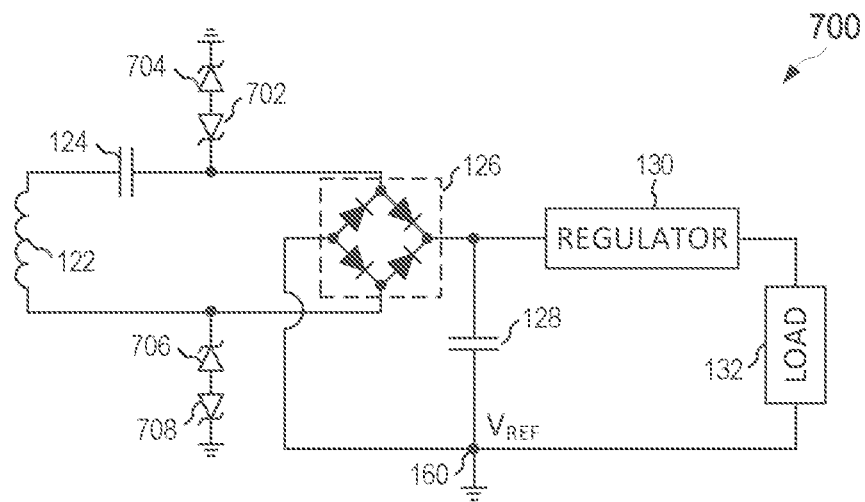
FIG. 7A is a schematic diagram of a receiving device configured with Zener diodes in a clamping circuit.

FIG. 7A is a schematic diagram of a receiving device 700 configured with Zener diodes (i.e., Z1 702, Z2 704, Z3 706, and Z4 708) in a clamping circuit. The clamping circuit, or limiter, is used to limit or cut-off portions of the incoming voltage at the rectifier 126. The values of the Zener diodes Z1 702, Z2 704, Z3 706, and Z4 are selected such as to clip an AC voltage that exceeds a threshold voltage at the rectifier 126. This effectively regulates the incoming AC voltage at the rectifier 126.

As shown, Zener diode Z1 702 and Zener diode Z2 704 are arranged as back-to-back connected Zener diodes. The cathode terminal of Z1 702 is coupled to the first terminal of the second windings 122 through the resonant capacitor 124. The anode terminal of Z1 702 is connected to the anode terminal of Z2 704. The cathode terminal of Z2 is connected to reference ground. The Zener diodes Z3 706 and Z4 708 are also arranged as back-to-back connected Zener diodes. The cathode terminal of Z3 706 is connected to the second terminal of the second windings 122. The anode terminal of Z3 706 is connected to the anode terminal of Z4 708. The cathode terminal of Z8 is connected to reference ground.

Although the solution is functional, the receiving device 700 is unaware that the clipping has occurred and that the voltage from a transmitting device exceeds the operational limits of the receiving device 700. Therefore, disadvantageously the receiving device 700 does not communicate a request to reduce the power level to the transmitting device. The solution is purely a safety precaution and disadvantageously does not provide a corrective action. Furthermore, excess power is continuously being dissipated through the receiving device 700, which may damage one or both of the receiving device 700 and the transmitting device. Also, the voltage clamping at the output of the rectifier 126 is fixed in voltage in respect to the reference. This may not adequately address various over-voltage scenarios, especially if the voltage at the output of the voltage regulator 130 is programmable. This may lead to a large range of operating voltage at the output of the rectifiers 126.

Figure 7B:
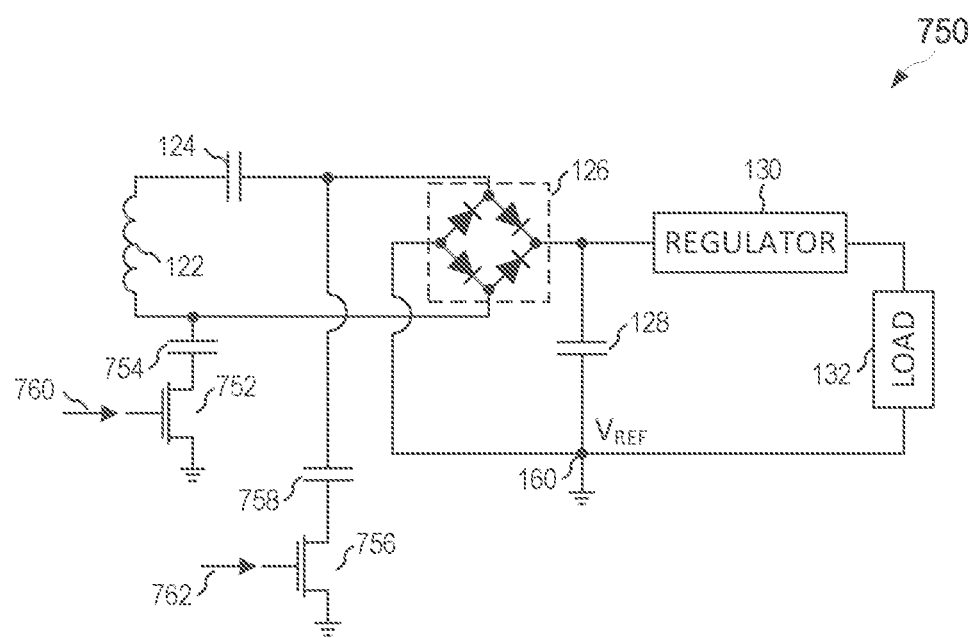
FIG. 7B is a schematic diagram of a receiving device configured with a de-tuning circuit.

FIG. 7B is a schematic diagram of a receiving device 750 configured with a de-tuning circuit. The de-tuning circuit includes a pair of active devices 752 and 756 and a pair of capacitors 754 and 758. Each capacitor 754 and 758 is coupled to an input terminal of the rectifier 126. The active device 752 is activated in accordance with the control signal 760 and the active device 756 is activated in accordance with the control signal 762. The control signals 760 and 762 may be provided by a microcontroller or activated automatically, for example, through a regulating monitoring circuit.

The receiving device 750, in response to determining an excess AC voltage at the input of the rectifier 126, provides control signals 760 and 762 to the active devices 752 and 756. The capacitors 754 and 758 de-tune the impedance between the second windings 122 and the rectifier 126. This effectively reduces the resonance factor at the second windings 122.

Similar to FIG. 7A, this is a functional solution to reduce the voltage at the rectifier 126. The level of de-tuning, however, is limited and can only protect the receiving device 750 against a limited amount of excess power. Therefore, disadvantageously the voltage at the input of the voltage regulator 130 may continue to increase despite the activation of the soft over-voltage-protection provided by the de-tuning.

Figure 7C:
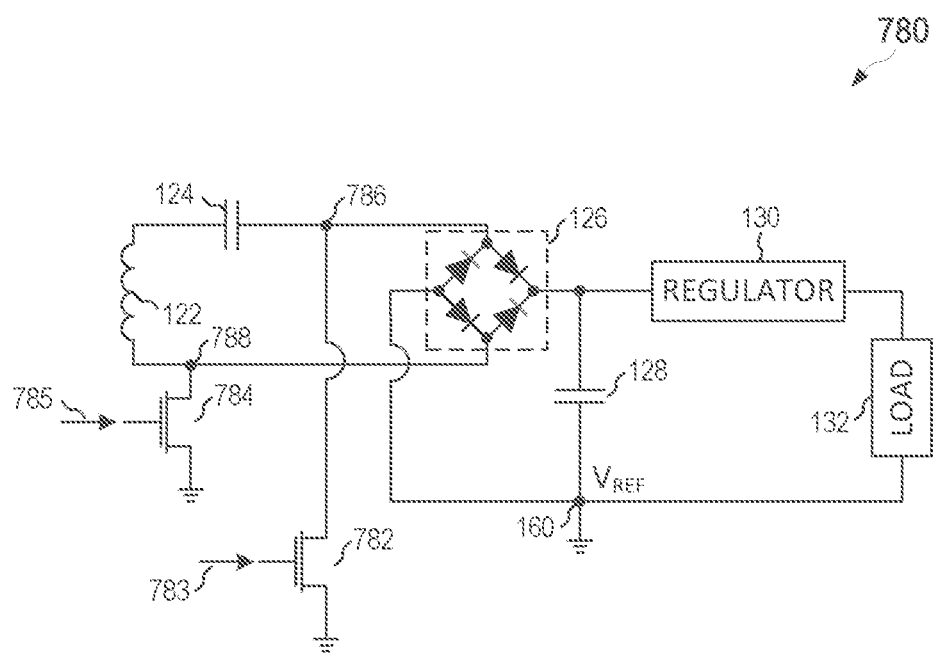
FIG. 7C is a schematic diagram of a receiving device configured with hard over-voltage protection.

FIG. 7C is a schematic diagram of a receiving device 780 configured with a hard over-voltage protection circuit. The hard over-voltage protection circuit may be implemented in any of the embodiments of this disclosure.

The hard over-voltage protection circuit includes a first active device 782 and second active device 784. The first active device 782 is coupled between a first input terminal 786 of the rectifier 126 and reference ground. The second active device 784 is coupled between a second input terminal 788 of the rectifier 126 and reference ground. In an embodiment, each of the first and second active device 782 and 784 is a MOSFET.

When the AC voltage at the two input terminals 786 and 788 of the rectifier 126 exceeds a predetermined voltage, the hard over-voltage protection may kick in. The hard over-voltage protection consists of shorting each of the two input terminals 786 and 788 to the reference ground through activating the first and second active device 782 and 784, respectively.

Disadvantageously, the solution blocks incoming wireless power transfer. Therefore, the receiving device 780 may not be able to properly communicate with the transmitting device 110, specifically in the case of in-band communication. Additionally, the excess power is dissipated in a limited number of components, which can cause damage to the various components.

These and other issues of the prior art are addressed with the embodiments of this disclosure, for example using the embodiments in FIGS. 2-4.

FIG. 8 is a flowchart of an embodiment method 800 for monitoring an over-voltage condition and regulating the input voltage to a voltage regulator 130 using a regulating circuit, as may be performed by a receiving device. At step 810, the receiving device monitors the voltage across the input and output terminals of the voltage regulator 130 using a monitoring circuit. In some embodiments, the monitoring may include direct voltage monitoring at each terminal. In some embodiments, the monitoring may include a difference in voltage across the voltage regulator 130. In other embodiments, the monitoring may include direct voltage monitoring at each terminal and monitoring the difference in voltage across the voltage regulator 130.

At step 820, the monitoring circuit upon determining that an over-voltage condition is present at the receiving device, activates a regulating circuit 210. The regulating circuit 210 regulates the voltage at the output of the rectifier 126 to return the voltage to a steady-state value. In one embodiment, the monitoring circuit may determine the over-voltage condition after detecting that the voltage $V_{RECT}$ exceeds a threshold voltage $V_{TH_1}$. In one embodiment, the monitoring circuit may determine the over-voltage condition after detecting that the voltage $V_{OUT}$ exceeds a threshold voltage $V_{TH_2}$. In one embodiment, the monitoring circuit may determine the over-voltage condition after detecting that the difference in voltage between the voltage $V_{RECT}$ and $V_{OUT}$ exceeds a reference voltage $V_{REF_2}$. In other embodiments, the monitoring circuit may determine the over-voltage condition after detecting any logical combination of any of the previous conditions.

The regulating circuit receives a voltage $V_{CONT}$ from the monitoring circuit. The value of WONT is set such that the regulating circuit 210 reduces the value of the voltage $V_{RECT}$ to a value near the steady-state voltage. In practical terms, the wireless power system reaches a new steady-state mode in which the value of the $V_{RECT}$ voltage is higher than the former steady-state mode (i.e., steady-state mode before the incoming power surge). The new steady-state mode is still within the steady-state parameters for which voltage is determined by the wireless power system parameters.

Optionally, at step 830, the receiving device may communicate to the transmitting device an end power transfer (EPT) request. In some embodiments, the EPT request is transmitted immediately after step 820 and the activation of the regulating circuit 210. In other embodiments, the transmission of the EPT request is delayed until a period of time has elapsed. In these embodiments, the receiving device checks if the regulating circuit 210 is still activated after the delay period, before transmitting the EPT request.

Optionally, at step 840, the receiving device may activate hard over-voltage protection and stop the receiving of the power at the receiving device. The receiving device may delay the activation of the hard over-voltage protection for a period of time after the regulating circuit 210 is activated to allow for the EPT request to be received and the transmitting device to shut down the power transfer.

It is noted that the receiving device 120 in the various embodiments of this disclosure may additionally include over-current, over-voltage, and over-temperature sensing circuits. The various sensing circuits may work in combination with the regulation loop circuit in the various embodiments to provide additional safety protection to the receiving device 120.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps. Regardless of the standard or type of wireless power transfer used, embodiments of this disclosure provide solutions to address over-voltage at the receiving elements and/or loading elements of the receiving device.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. An over-voltage protection circuit, comprising:
   a first comparator, a first input of the first comparator coupled to an output of a rectifier, a second input of the first comparator configured to receive a first threshold voltage;
   a first differential amplifier having a first input coupled to the output of the rectifier, a second input of the first differential amplifier coupled to an output of a voltage regulator, the voltage regulator coupled to the rectifier and configured to convert a direct current voltage from the rectifier to a first regulated direct current voltage;
   a second comparator, a first input of the second comparator coupled to an output of the voltage regulator, a second input of the second comparator configured to receive a second threshold voltage;
   a second differential amplifier having a first input coupled to an output of the first differential amplifier, a second input of the second differential amplifier coupled to a first reference voltage;
   a third comparator, a first input of the third comparator coupled to the output of the first differential amplifier, a second input of the third comparator coupled to a second reference voltage;
   a multiplexer having a first input coupled to the output of the first comparator, a second input of the multiplexer coupled to an output of the second comparator, and a third input of the multiplexer coupled to an output of the third comparator;
   a switch, an input of the switch coupled to the output of the second differential amplifier, a control terminal of the switch coupled to an output of the multiplexer; and
   a regulating circuit, an input of the regulating circuit coupled to the output of the voltage regulator, a control terminal of the regulating circuit coupled to the output of the switch.

2. The over-voltage protection circuit of claim 1, wherein the first differential amplifier is configured to provide an output voltage corresponding to an amplified difference between a voltage at the output of the rectifier and a voltage at the output of the voltage regulator.

3. The over-voltage protection circuit of claim 1, further comprising a controller coupled to a select signal of the multiplexer, the controller configured to forward an input of the multiplexer to its output based on a logical combination of signals received from the first comparator, the second comparator, the third comparator, or a combination thereof.

4. The over-voltage protection circuit of claim 3, further comprising a memory configured to store configuration settings for the multiplexer based on the logical combination of signals.

5. The over-voltage protection circuit of claim 4, wherein the configuration settings are pre-programmed or programmed through a firmware update to the controller.

6. The over-voltage protection circuit of claim 1, wherein the regulating circuit is configured to regulate a voltage at the output of the rectifier in accordance with a control voltage provided by the second differential amplifier.

7. The over-voltage protection circuit of claim 1, wherein the regulating circuit comprises an active device and a dissipating element.

8. A device, comprising:
 a rectifier configured to receive an alternating current (AC) voltage and output a direct current (DC) voltage;
 a voltage regulator configured to receive the DC voltage and output a regulated DC voltage;
 an over-voltage protection circuit configured to determine whether the AC voltage exceeds a steady-state operating condition, the over-voltage protection circuit comprising:
  a first comparator, a first input of the first comparator coupled to an output of the rectifier, a second input of the first comparator configured to receive a first threshold voltage,
  a first differential amplifier having a first input coupled to the output of the rectifier, a second input of the first differential amplifier coupled to an output of the voltage regulator,
  a second comparator, a first input of the second comparator coupled to an output of the voltage regulator, a second input of the second comparator configured to receive a second threshold voltage,
  a second differential amplifier having a first input coupled to an output of the first differential amplifier, a second input of the second differential amplifier coupled to a first reference voltage,
  a third comparator, a first input of the third comparator coupled to the output of the first differential amplifier, a second input of the third comparator coupled to a second reference voltage,
  a multiplexer having a first input coupled to the output of the first comparator, a second input of the multiplexer coupled to an output of the second comparator, and a third input of the multiplexer coupled to an output of the third comparator, and
  a switch, an input of the switch coupled to the output of the second differential amplifier, a control terminal of the switch coupled to an output of the multiplexer; and
 a regulating circuit configured to regulate the DC voltage in response to the over-voltage protection circuit determining that the AC voltage exceeds the steady-state operating condition.

9. The device of claim 8, wherein the first differential amplifier is configured to provide an output voltage corresponding to an amplified difference between a voltage at the output of the rectifier and a voltage at the output of the voltage regulator.

10. The device of claim 8, further comprising a controller coupled to a select signal of the multiplexer, the controller configured to forward an input of the multiplexer to its output based on a logical combination of signals received from the first comparator, the second comparator, the third comparator, or a combination thereof.

11. The device of claim 10, further comprising a memory configured to store configuration settings for the multiplexer based on the logical combination of signals.

12. The device of claim 11, wherein the configuration settings are pre-programmed or programmed through a firmware update to the controller.

13. The device of claim 8, wherein the regulating circuit is configured to regulate the DC voltage in accordance with a control voltage provided by the second differential amplifier.

14. The device of claim 8, wherein the regulating circuit comprises an active device and a dissipating element.

15. A method for regulating an over-voltage condition in a wireless power system, the method comprising:
 generating, by a rectifier, a direct current (DC) voltage based on an alternating current (AC) voltage;
 regulating, by a voltage regulator, a regulated DC voltage based on the DC voltage;
 determining, by an over-voltage protection circuit, whether the AC voltage exceeds a steady-state operating condition, the over-voltage protection circuit comprising:
  a first comparator, a first input of the first comparator coupled to an output of the rectifier, a second input of the first comparator coupled to a first threshold voltage,
  a first differential amplifier having a first input coupled to the output of the rectifier, a second input of the first differential amplifier coupled to an output of the voltage regulator,
  a second comparator, a first input of the second comparator coupled to an output of the regulator, a second input of the second comparator configured to receive a second threshold voltage,
  a second differential amplifier having a first input coupled to an output of the first differential amplifier, a second input of the second differential amplifier coupled to a first reference voltage,
  a third comparator, a first input of the third comparator coupled to the output of the first differential amplifier, a second input of the third comparator coupled to a second reference voltage,
  a multiplexer having a first input coupled to the output of the first comparator, a second input of the multiplexer coupled to an output of the second comparator, and a third input of the multiplexer coupled to an output of the third comparator, and
  a switch, an input of the switch coupled to the output of the second differential amplifier, a control terminal of the switch coupled to an output of the multiplexer; and
 regulating, by a regulating circuit, the DC voltage in response to the over-voltage protection circuit determining that the AC voltage exceeds the steady-state operating condition.

16. The method of claim 15, further comprising generating, by a controller coupled to the multiplexer, a select signal such that multiplexer forwards a signal at its input to its output based on a logical combination of signals received from the first comparator, the second comparator, the third comparator, or a combination thereof.

17. The method of claim 16, further comprising storing, by a memory coupled to the controller, configuration settings for the multiplexer based on the logical combination of signals.

18. The method of claim 17, wherein the configuration settings are pre-programmed or programmed through a firmware update to the controller.

19. The method of claim 15, further comprising regulating, by the regulating circuit is configured to regulate, the DC voltage in accordance with a control voltage provided by the second differential amplifier.

20. The method of claim 15, wherein the regulating circuit comprises an active device and a dissipating element.

* * * * *